S. CARPENTER.
SPRING WHEEL.
APPLICATION FILED MAR. 16, 1918.

1,302,306. Patented Apr. 29, 1919.
2 SHEETS—SHEET 1.

Witnesses

Inventor
S. Carpenter,
By Victor J. Evans
Attorney

S. CARPENTER.
SPRING WHEEL.
APPLICATION FILED MAR. 16, 1918.
1,302,306. Patented Apr. 29, 1919.
2 SHEETS—SHEET 2.
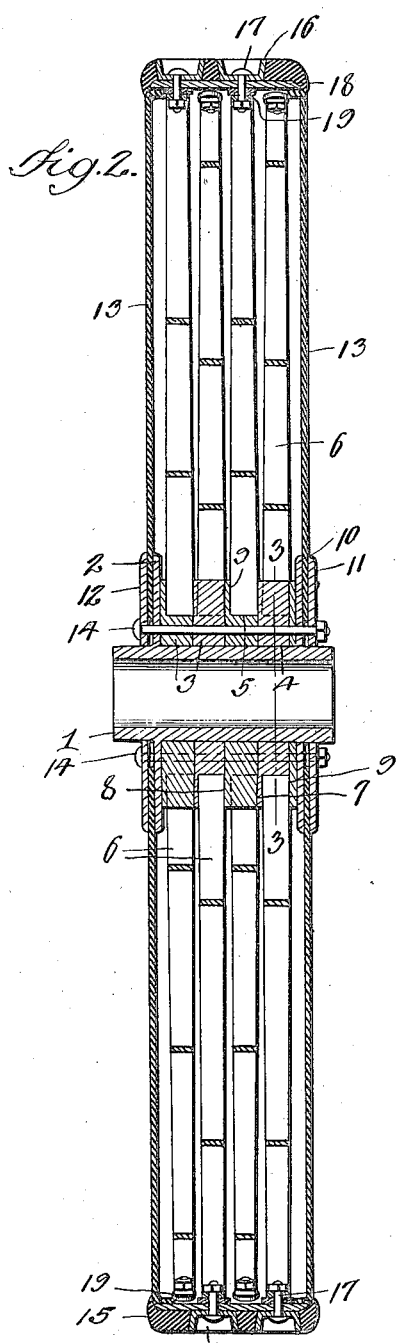
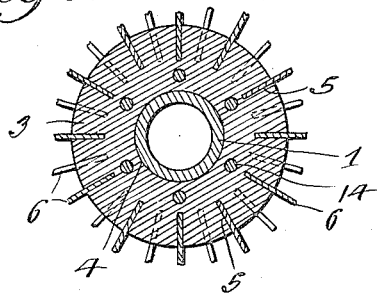
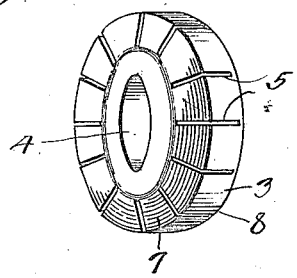
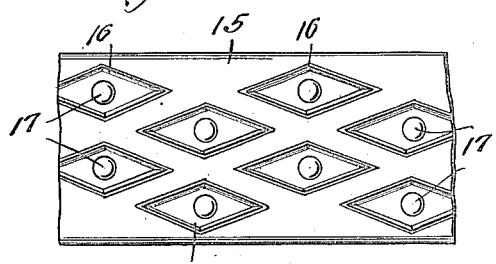
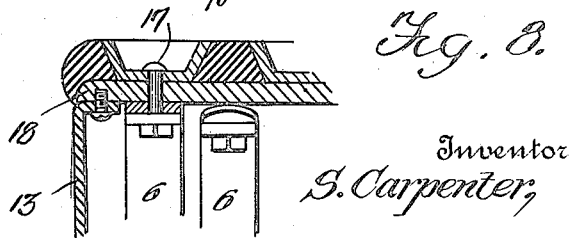
Inventor
S. Carpenter,
By Victor J. Evans
Attorney

UNITED STATES PATENT OFFICE.

STEPHEN CARPENTER, OF SOUTH GIBSON, PENNSYLVANIA.

SPRING-WHEEL.

1,302,306.　　　　　　Specification of Letters Patent.　　Patented Apr. 29, 1919.

Application filed March 16, 1918.　Serial No. 222,956.

*To all whom it may concern:*

Be it known that I, STEPHEN CARPENTER, a citizen of the United States, residing at South Gibson, in the county of Susquehanna and State of Pennsylvania, have invented new and useful Improvements in Spring-Wheels, of which the following is a specification.

This invention relates to spring wheels, the object in view being to produce a wheel which will eliminate the necessity for using a pneumatic tire, thereby also doing away with the troubles incident to the use of a pneumatic tire, such as punctures and blow-outs.

The improved wheel embodies a novel construction and combination of parts including a special arrangement of groups of springs, the way of combining said springs or resilient spokes with the hub and tread of the wheel and other novel features whereby a highly efficient and resilient wheel is produced that will absorb all ordinary road shocks and vibrations and prevent the transmission of the same to the body of the vehicle.

Other objects and advantages will be apparent as the nature of the invention is better understood, reference being had to the accompanying drawings, in which, Figure 1 is a side elevation partly broken away in section of the improved wheel.

Fig. 2 is a transverse section through the same.

Fig. 3 is a fragmentary vertical section on the line 3—3 of Fig. 2 but showing the spokes in elevation.

Fig. 4 is a detail perspective view of one of the spoke holding disks or hub sections.

Fig. 6 is a fragmentary plan view of the tread.

Fig. 8 is an enlarged fragmentary transverse section through the tire and its supporting structure.

Figure 1:
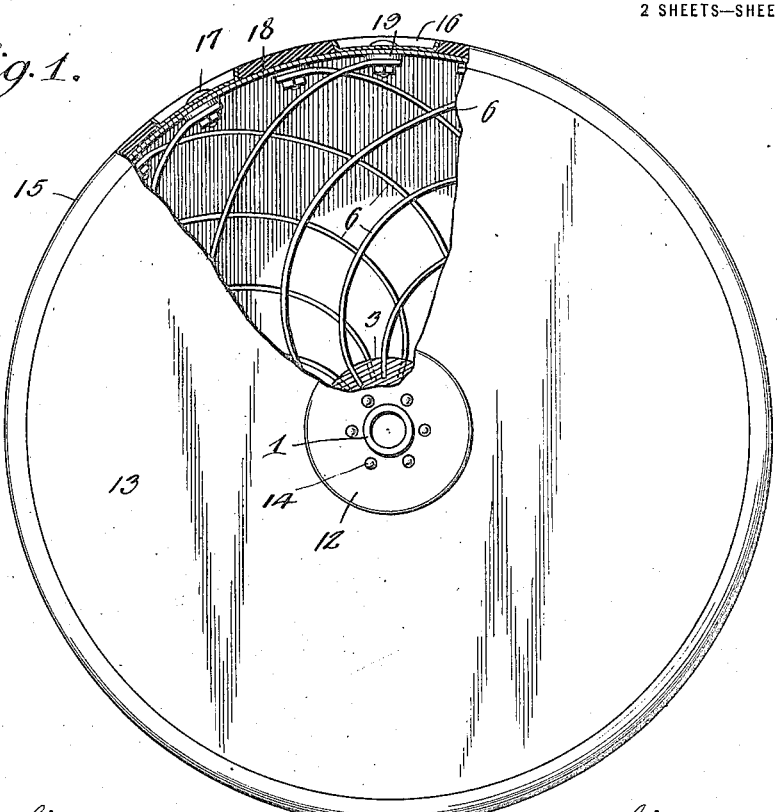

Referring to the drawings 1 designates the wheel hub, which, for the purpose of carrying out this invention, is provided, adjacent to one end thereof with a circumferential flange or abutment 2 against which the spoke holding disks or members hereinafter referred to are clamped, said flange also serving as an abutment against which the flexible sheathing hereinafter referred to is clamped.

Encircling the hub 1 is a plurality of spoke holding disks or members 3 each having an opening 4 to receive the main body of the hub 1 and formed in the periphery and one side thereof with spoke holding slots 5 each of which is adapted to receive one of a number of resilient spokes or springs 6. Each disk or member 3 preferably has a convex face 7 and concave side 8, the convex side of one disk fitting snugly against the concave side of the adjacent disk. The inner end of each spoke is made slightly flaring as shown at 9 so as to fill the respective slot 5 and therefore when all of the spokes and members 3 are in their final clamped positions, the inner extremities of the spokes are prevented from escaping from the slots 5, the connection between each spoke and the respective holding member 3 being of a dove-tailed character. One of the members 3 is clamped directly against the inner face of the flange 2. Against the outer face of the last member 3, there is placed a clamping disk or collar 10. Other clamping disks 11 and 12 are located beyond the flanges 10 and 2 and are adapted to clamp between them side flexible sheathing disks 13 of any suitable flexible material which will prevent the admission of dust, dirt or other foreign matter to the space within which the springs or resilient spokes are contained. Tie bolts 14 extend through all of the members 3 as well as the members 2, 10, 11 and 12 and serve to clamp all of said parts firmly together.

Figure 5:
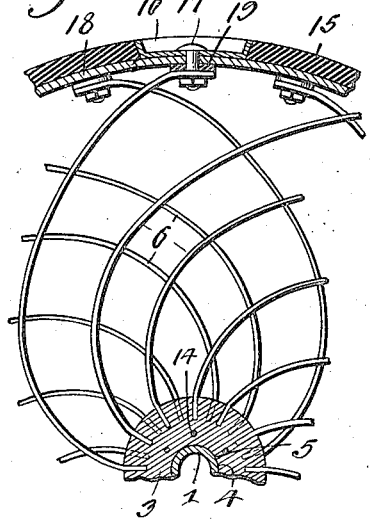
Fig. 5 is a fragmentary vertical longitudinal sectional view through the wheel showing the means for securing the spokes and tread together.

15 designates the tread of the wheel, the main body thereof being formed of resilient material such as rubber or rubber and fabric. In conjunction with the tread 15 I employ series of diamond or other shaped traction or non-skid metal members 16 which are flanged and dished as shown, the outer edges thereof lying flush with the outer surface of the tread. Securing means such as bolts 17 extend through the members 16 and also through holes in the outer extremities of the springs as best shown in Fig. 5. The tread 15 encircles the outer tread supporting band 18 the bolts 17 passing therethrough, and also through flexible or resilient washers 19 interposed between the outer ends of the spokes and the band 18.

Figure 7:
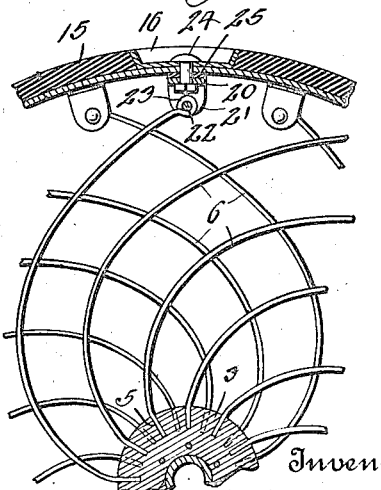
Fig. 7 is a sectional view similar to Fig. 5 showing another way of securing the spokes and tread together.

Another way of securing the outer extremities of the spokes to the tread is shown in Fig. 7, in which I employ in connection with each spoke extremity a U-shaped clip 20 having oppositely arranged inwardly extending ears 21 which receive a pin 22 extending through an eye 23 formed at the outer extremity of the adjacent spoke. This allows a pivotal or turning movement between the outer extremity of the spoke and the tread. The clip 20 is secured to the tread by a bolt 24 passing through the clip and the tread as well as the outer connecting or rim portion 18 of the sheathing 13, a resilient washer 25 being interposed between said clip and connecting portion 18.

From the foregoing description, when taken in connection with the accompanying drawings, the simplicity and advantages of the construction will be apparent, it is thought, without further detailed description.

Having thus described the invention, what I claim is:

1. In a resilient wheel, the combination of a hub, a tread, a flange formed integrally with the main body of the hub and surrounding the same, a plurality of spoke holding disks encircling said hub, a clamping collar encircling said hub, tie bolts extending through said flange, collar and disks, a plurality of series of spring spokes rectangular in cross section and having their inner ends connected to said disks and having their outer extremities attached to the tread, said disks having concave and convex meeting faces and being formed with spoke receiving slots of progressively increasing width transversely of the hub and in an inward direction, and each of the spokes having a correspondingly flared inner end portion filling the respective slots of the adjacent disk, whereby a dovetailed connection is obtained between each spoke and its holding disk.

2. In a resilient wheel, the combination of a hub, a tread, a flange formed integrally with the main body of the hub and surrounding the same, a plurality of spoke holding disks encircling said hub, a clamping collar encircling said hub, tie bolts extending through said flange, collar and disks, a plurality of series of spring spokes having their inner ends connected to said disks and having their outer extremities attached to the tread, other clamping collars surrounding the body of the hub and receiving said tie bolts, and flexible side sheathings extending from the tread to the hub and clamped in place by the last named collars.

3. In a spring wheel, the combination with a hub, a flexible tread, spring spokes connecting the hub and tread, metal inserts seated in the tread, said inserts being of dished and flanged formation, and fasteners inserted through said inserts and also through the adjacent outer extremities of the spokes.

In testimony whereof I affix my signature.

STEPHEN CARPENTER.